United States Patent [19]
Briggs et al.

[11] Patent Number: 5,955,203
[45] Date of Patent: Sep. 21, 1999

[54] RESIN-COATED OVERLAYS FOR SOLID SUBSTRATES

[75] Inventors: William Scott Briggs, Ridgefield; Stephen James Tellman, County of Skamania, both of Wash.

[73] Assignee: Simpson Timber Company, Seattle, Wash.

[21] Appl. No.: 08/318,911

[22] Filed: Oct. 5, 1994

[51] Int. Cl.$^6$ ........................................... B32B 15/08
[52] U.S. Cl. ........................ 428/460; 428/464; 428/484; 428/485; 428/486; 428/526; 428/528; 428/530; 428/537.1; 428/537.5; 156/307.4
[58] Field of Search ..................... 428/460, 464, 428/524, 526, 528, 530, 537.1, 537.5, 541, 542.2, 484, 485, 486; 156/307.4

[56] References Cited

U.S. PATENT DOCUMENTS

| | | | |
|---|---|---|---|
| 3,616,028 | 10/1971 | Miller et al. | 156/275.5 |
| 3,654,004 | 4/1972 | Hirota | 156/220 |
| 3,748,222 | 7/1973 | Wheeler | 162/165 |
| 4,154,882 | 5/1979 | Ungar et al. | 428/172 |
| 4,492,726 | 1/1985 | Rosenberg | 428/192 |
| 4,532,170 | 7/1985 | O'Dell et al. | 428/143 |
| 4,713,138 | 12/1987 | Ungar et al. | 156/307.4 |
| 4,991,248 | 2/1991 | Allen | 14/73 |
| 5,041,322 | 8/1991 | Fouguet | 428/106 |
| 5,071,688 | 12/1991 | Hoffman | 428/106 |
| 5,089,348 | 2/1992 | Louderback | 428/464 |
| 5,093,185 | 3/1992 | Ungar et al. | 428/204 |
| 5,116,446 | 5/1992 | Cannon | 156/307.4 |
| 5,141,799 | 8/1992 | Mehta et al. | 428/207 |
| 5,187,000 | 2/1993 | Chow et al. | 428/141 |

FOREIGN PATENT DOCUMENTS

| | | |
|---|---|---|
| 186 257 | 7/1986 | European Pat. Off. . |
| 540 838 A1 | 8/1992 | European Pat. Off. . |
| 2 331 440 | 6/1977 | France . |

OTHER PUBLICATIONS

HDO/MDO Plywood, APA–The Engineered Wood Association, Product Guide, Nov. 1996.

APA–The Engineered Wood Association, Voluntary Product Standard, PS1–95, Construction And Industrial Plywood (With Typical APA Trademarks), Sep. 7, 1995.

*Primary Examiner*—Leszek Kiliman
*Assistant Examiner*—Holly C Rickman
*Attorney, Agent, or Firm*—Seed and Berry LLP

[57] ABSTRACT

There is disclosed a resin-coated overlay for bonding to solid substrates, and which imparts improved waterproofing and chemical resistance to the resulting resin-coated overlaid solid substrate. Depending upon the desired end use of resin-coated overlaid solid substrate, the resin-coating may be modified to impart desirable surface features and/or characteristics. For example, additives such as waxes, oils, silicones, fluorocarbons and fatty acid compounds may be used to promote the release of concrete from forms made of solid substrates overlaid with the resin-coated overlays of the present invention. Moreover, resin-coated overlaid solid substrates may be produced having a surface which is suitable for painting and which accepts application of various tape products. Other modifications are disclosed which can be used to gain desirable cure speed, cost, and chemical/mechanical properties in the resin-coating. In addition to variations on the resin-coated overlay, related methods are also disclosed for the production of resin-coated overlays and resin-coated overlaid solid substrates.

11 Claims, 1 Drawing Sheet

RESIN-COATED OVERLAYS FOR SOLID SUBSTRATES

TECHNICAL FIELD

This invention generally relates to resin-coated overlays for adhering to solid substrates and, more specifically, to resin-coated overlays which impart a smooth and durable surface to the solid substrate when adhered thereto.

BACKGROUND OF THE INVENTION

Paper overlays, including paper overlays saturated with phenolic resin, have been used to improve the surface properties of wood-based substrates such as plywood, particleboard, waferboard and oriented strandboard (OSB). These overlays have been made with various basis-weight papers, resin contents, additives and other constituents in order to perform a variety of functions. For example, as defined in U.S. Product Standard PS.1-83 (American Plywood Association), the most common phenolic resin-saturated overlays used in North America are Medium Density Overlays (MDOs) and High Density Overlays (HDOs). Moreover, Phenolic Surface Films (PSFs) are overlays widely used throughout the rest of the world including a growing, but limited, market in North America.

MDOs have phenolic resin contents ranging from about 22–45% by weight, are generally prepared using heavier basis-weight papers, and contain nearly fully-cured (i.e., "C-staged") saturating resin. In contrast, HDOs and PSFs are generally prepared from lighter weight papers, have resin contents greater than about 45% by weight, and contain only partially-cured (i.e., "B" staged) saturating resin. In addition, currently-available MDOs are typically manufactured having a coating of thermosetting adhesive on one side of the overlays for adherence to wood-based substrates, whereas HDOs and PSFs do not include this adhesive-coating since they are self-bonding during subsequent hot-press application to wood-based substrates due to their high resin content.

MDOs, HDOs and PSFs are typically applied to one or both surfaces of a wood-based substrate by pressing in either a stepwise or continuous manner between the heated platens of a press. Flat or textured carrier cauls are commonly employed to impart the desired surface appearance to the overlay, and to prevent contamination of the platen surfaces. Typically, the formation of the wood-based substrate and application of the phenolic resin-saturated overlay take place concurrently in what is termed a "one-step" process. Alteratively, formation of the wood-based substrate and application of the phenolic resin-saturated overlay may involve separate pressing operations, in which case manufacture is termed a "two-step" process. Pressing conditions are dependent on the exact nature of the overlay and finished product being manufactured, but temperatures of 250° F.–400° F. and pressures of 200–350 pounds per square inch (psi) are typical. Duration of pressing depends on platen temperature and on heat transfer conditions in the press, and cycle times of 4–10 minutes are commonly employed.

MDOs typically are used to upgrade wood-based substrates by providing a smoother surface with better paintability, as well as improving resistance to mechanical abrasion and/or chemical attack. In addition, MDOs may be used as "cushion sheets" under HDOs and PSFs. The greater thickness, stiffness and tensile strength of MDO provide an effective cover for surfaces of wood-based substrates not suitable for direct application of HDO or PSF alone. Since the quality of available timber has decreased dramatically in many parts of the world due to depletion of old growth forests, the need for overlays to upgrade inferior wood surfaces, as well as cover wood products made from "young" growth resources, is expanding.

A major application area for overlaid wood-based substrates has been in the construction of forms for the casting of concrete. For this purpose, overlaid wood-based substrates have performed well, exhibiting a good combination of ease of machinability, durability and resistance to the aggressive chemical agents present in wet concrete, while also imparting the desired surface to the finished concrete. For example, U.S. Pat. No. 5,089,348, to Louderback (incorporated herein by reference in its entirety), discloses concrete forms made by adhering a pre-cured laminate overlay to a plywood substrate. The Louderback patent also provides an overview of existing technology used to manufacture concrete forms using plywood overlaid with MDO and/or HDO.

However, a major problem arises with the use of existing overlaid plywood concrete forms. In order to further waterproof the overlaid surface of the form in contact with the concrete (i.e., "the working surface" of the form), and to provide a shear plane to aid in the release of the form's working surface from the cured concrete, the working surface is coated before each use with a form release mixture which generally includes a hydrocarbon oil, waxy substances and/or other chemical agents in a hydrocarbon solvent. These form-release mixtures (referred to as "form oils") ease release of the cured concrete from the working surface of the form by formation of a physical discontinuity (i.e., an oil-water interface) between the form's working surface and the cured concrete. Moreover, chemical additives (e.g., fatty acids and fatty acid esters) may be added to form oils to generate a "reactive release" surface. Such chemical additives act by forming a weak, chemically-discontinuous phase on the working surface of the form which provides additional assistance in the subsequent release of the cured concrete.

With increased environmental pressure to limit the escape of volatile elements into the atmosphere, and avoid possible contamination of soil and ground water from construction site runoff or spillage, coating of concrete forms with form oils have come under increased scrutiny. Depending upon the amount of mechanical fitting (e.g., installation of reinforcing iron, electrical conduit, utility pipes, etc.) which must be completed before the concrete is poured, the form oils may be exposed to the elements and worker traffic for an extended period. In hot areas of the world, for example, the surface temperatures of horizontal concrete forms can easily exceed 150° F. Such temperatures can volatilize various components of the form oils, thereby reducing its effectiveness and contributing to environmental pollution. Rain exposure and attendant runoff can likewise lead to environmental contamination, while also diminishing performance of the form oils.

Accordingly, there is a need in the art for concrete forms which do not require application of form oils to the working surfaces thereof, or which can greatly reduce the amount necessary to impart acceptable release properties to the form. There is also a need for overlays that can effectively cover poorer quality solid substrates (particularly wood-based substrates) and produce a surface comparable or superior to that now obtained by combining one or more sheets of HDO or PSF with an underlayment of MDO. In addition, there is a need in the art for methods of manufacturing such improved overlays, as well as solid substrates having such overlays adhered to a surface thereof. The present invention fulfills these needs, and provides further related advantages.

SUMMARY OF THE INVENTION

Briefly stated, the present invention is directed to a resin-coated overlay suitable for application to a solid substrate to impart a smooth and durable surface to the solid substrate. The resin-coated overlay comprises a fibrous substrate having a partially-cured resin-coating on at least a portion of a surface of the fibrous substrate. In an optional embodiment, the resin-coated overlay further comprises an adhesive layer. For example, when the partially-cured resin coating is applied to the "top" layer of the fibrous substrate, the adhesive layer may be applied to the "bottom" surface of the fibrous substrate (i.e., the surface which will be in contact with the solid substrate). The resin-coated overlay is adhered to a solid substrate, such as a wood-based substrate, by conventional techniques to yield a resin-coated overlaid solid substrate. During this step, the partially-cured resin-coating on the surface of the fibrous substrate is substantially-cured such that the resin-coating of the resulting overlaid solid substrate is substantially-cured.

In another aspect of the present invention, a resin composition is disclosed for use in coating the fibrous substrate. Once the fibrous substrate is coated, the resin composition is partially-cured to yield the resin-coated overlay. Resin compositions of this invention include thermosetting and thermoplastic resins, and preferably are thermosetting or thermoplastic phenolic-based resins. Depending upon the desired end use of the resin-coated overlaid solid substrate, the resin composition may further include additional components. For example, when the resin-coated overlaid solid substrate is to be used as a concrete form, the resin composition further comprises a wax.

Methods for manufacturing resin-coated overlays of this invention, as well as resin-coated overlaid solid substrates, are also disclosed.

These and other aspects of the present invention will become evident upon reference to the following detailed description and attached drawings.

DETAILED DESCRIPTION OF THE INVENTION

Figure 1:
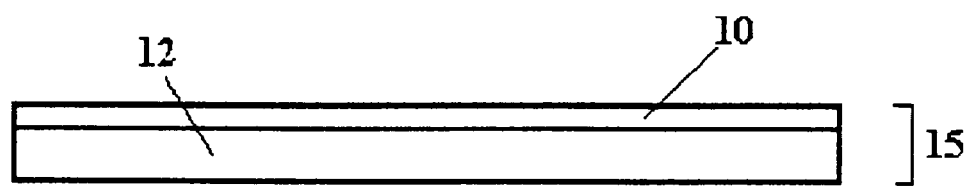
FIG. 1 illustrates a resin-coated overlay 15 of this invention, wherein the resin-coated overlay 15 comprises fibrous substrate 12 having a partially-cured resin coating 10 thereon.

As mentioned above, the present invention is directed to a resin-coated overlay for adhering to a solid substrate to yield a resin-coated overlaid solid substrate having a smooth, hard and durable surface (i.e., a surface which is resistant to both abrasion and chemical attack). The resin-coated overlay of the present invention has a variety of end uses. For example, depending upon the nature of the components within the resin-coated surface of the overlay, the resin-coated overlay of this invention serves to increase adherence of paint and tape to solid substrates (e.g., for use as road or highway signs), achieves superior release characteristics for solid substrates (e.g., for use in concrete forms), and generally provides an easily-cleaning, freely-draining and non-wetting surface to solid substrates (e.g., for use as bulk bins or fruit lugs).

The resin-coated overlay of this invention is made by coating a surface of a fibrous substrate with a resin composition, and then partially-curing the resin-coating on the surface of the fibrous substrate. Alternatively, the fibrous substrate may be saturated with the resin composition, followed by partial-curing of the resin composition on the surface of the fibrous substrate. Thus, as used in the context of the present invention, the resin-coated overlay comprises a fibrous substrate having a partially-cured resin-coating on at least one surface of the fibrous substrate. When the resin-coated overlay is subsequently adhered to the solid substrate by applying suitable heat and pressure thereto, the resin-coating is substantially-cured. Accordingly, it should be understood that the resin-coated overlay of this invention, when adhered to the solid substrate, has a surface coating of the resin composition that is substantially-cured; while the same resin-coated overlay, prior to adhering to the solid substrate, has a surface coating of the resin composition that is only partially-cured.

The resin-coated overlay of the present invention provides a hard and resistant surface coating to the solid substrate by employing comparatively inexpensive resin compositions, and by utilizing the heat and pressure of hot pressing operations which are already part of solid substrate production and/or overlaying processes. This provides a significant savings in cost and equipment compared to use of coatings based on more expensive resins that must be cured by other means in a separate operation. The resin composition of this invention cures significantly faster than current HDO overlays, thus providing for shorter hot press cycles, as well as cost advantages through increased hot press throughput. In addition, the resin-coated overlays of this invention do not require cooling before stacking (which is required when using HDO to minimize face-cracking or checking and discoloration from overcure). This obviates the need for special cooling facilities and handling with the attendant energy consumption required to successfully apply HDOs.

Furthermore, the resin composition of this invention, when applied to MDO or other thermosetting fibrous substrate, does not cause as much shrinkage of the resin-coated overlay during hot pressing as observed using HDO/MDO or PSF/MDO combinations. This reduces the need for a "balancing" overlay to be applied to the opposite side of the solid substrate (such as a wood panel) to control warpage. In products requiring only one working face, the elimination of a balancing overlay represents a significant cost savings. The cost of manufacturing coated MDO is also significantly less than the combined cost of manufacturing the MDO and HDO or PSF, since only one overlay must be handled (i.e., thus saving time, labor, inventory and potential breakage in handling as compared to conventional multiple sheet lay-ups of HDO or PSF with MDO).

In the context of the present invention, the term "solid substrate" refers to any suitable substrate including, by way of example, wood-based substrates such as plywood, oriented strandboard, waferboard, particleboard, laminated veneer lumber and the like, as well as metal-based substrates such as bonderized or etched steel or aluminum sheets. The term "fibrous substrate" refers to any substrate which is suitable for coating or impregnation with a resin composition of the present invention, and are discussed in greater detail below. The term "resin composition" refers to any one or more of the resin compositions of the present invention as disclosed below. The term "bonding" refers to the fusion, adhesion, or attachment, by any suitable means, of any combination of the solid and fibrous substrates of this invention.

Resin compositions of this invention contain a thermosetting or thermoplastic resin and, in a preferred embodiment, contain a phenolic-based thermosetting or thermoplastic resin. In a more preferred embodiment, the resin is a thermosetting phenolic-based resin. As used in this invention, the term "phenolic-based" means a resin which contains phenol and/or a phenol derivative, including (but not limited to) cresol, catechol, resorcinol and bisphenol. Phenolic-based resins may generally be produced as a condensate of a phenolic-based compound and an aldehyde by heating to boiling under vacuum, or refluxing at about 212° F. in the presence of an acid or base catalyst, at a mole ratio of phenol-based compound to aldehyde of about 1:0.5 to 1:2.5. Suitable aldehydes for this purpose include formaldehyde, acetaldehyde, propionaldehyde and furfural, with formaldehyde being preferred. The phenolic-based compounds may be further modified by aminotriazines, such as melamine or guanamines, or by urea. When the mole ratio of the phenolic-based compound and the aldehyde is greater than about 1:1, thermosetting phenolic-based resins are generally obtained. Conversely, when the mole ratio of the phenolic-based compound and the aldehyde is less than about 1:1, thermoplastic phenolic-based resins are generally obtained.

Phenolic-based resins suitable for use in this invention are commercially-available under the trade names CASCOPHEN (Borden Chemical) and BAKELITE (Georgia Pacific Resins, Inc.). Thermosetting and thermoplastic resins of this invention, in addition to the phenolic-based resins disclosed above, include (but are not limited to) melamine-based resins such as CASCOMEL (Borden Chemical), and poly-ester based resins such as RHOPLEX (Rohm and Haas Company) and STYRON (Dow Plastics).

In addition to one or more thermosetting or thermoplastic resins, the resin compositions of this invention may also contain one or more optional components, the nature and quantity of which depend on the end use of the resin-coated overlaid solid substrate. For example, when the resin-coated overlaid solid substrate is to be used as a concrete form, the resin composition contains one or more suitable waxes in an amount ranging from about 2–45% by weight (based on the weight of the resin component). As used herein, the term "wax" refers to any member of the class of unctuous, semi-solid, natural or petroleum-derived substances with wax-like characteristics. Waxes include any synthetic or naturally-occurring polyester or hydrocarbon wax, or combination thereof. Suitable waxes include waxes, silicones, fluorocarbons, fatty acids and mixtures thereof; aqueous emulsions of paraffin, carnauba, microcrystalline, polyethylene, polypropylene or other material or hydrocarbon waxes, or blends thereof, including MICHEM or MICHEMLUBE products (Michelman, Inc.); similar aqueous emulsions (Hopton Technology, Inc.); dispersions of microcrystalline or oxidized microcrystalline wax (Petrolite Corporation); silicone emulsions (Dow Corning, Wacker Silicones, or Genesee Polymers Corporation) and fluorocarbon emulsions (E. I. du Pont de Nemours Company). Preferably, waxes are added to the resin composition as aqueous emulsions. Aqueous emulsions may be easily combined with a water-dilutable thermosetting resin by simple mechanical mixing by using an overhead stirrer (such as a Lightning mixer or Cowles dissolver). When the wax is present in the resin composition at low levels, the resulting surface of the resin-coated overlaid solid substrate has a smooth, non-greasy surface. In contrast, when the wax is present in the resin composition at high levels, wax exudes as an oily film on the surface of the resin-coated overlaid solid substrate, and thus aids in the release of the cured concrete.

In an alternative embodiment, the resin-coated overlaid solid substrate may provide a surface which is paintable and which is suitable for adherence of tape-based products (such as commercially available reflective tape). In this embodiment, the resin composition contains agents which will render the resulting resin-coating on the surface of the overlaid solid substrate suitable for painting. Thus, while waxes may be present in the resin composition in this embodiment up to a concentration of about 2% by weight, their concentration is kept to a sufficiently-low level such that paint and/or tape may adhere to the resin-coated surface of the overlaid solid substrate.

Optional components which may be present in the resin composition (depending upon the intended use of the resin-coated overlaid solid substrate) include film-forming agents, colorants, auxiliary release agents, defoamers, paintability-enhancing agents, and leveling agents. Such ingredients may be used to modify the cure speed, cost or chemical/mechanical properties of the resin composition. Generally, the above optional components may be present in the resin composition in an amount generally ranging from about 0.1%–10% by weight of the resin, typically from about 0.25%–8%, and preferably from about 0.5%–5%.

Film-forming agents include agents which increase the membranous character of the resin composition, including (but not limited to) CASCOREZ IB-515. Colorants include any one of several colorants capable of altering the color of the resin composition or the resin-coated overlay, including (but not limited to) azodyes (BASF, Passaic Chemical), pigments (Hüls America) or inorganic complexing agents such as ferric chloride. Auxiliary release agents include any one of several agents capable of increasing the release characteristics of the resin-coated overlay, and hence the resin-coated overlaid solid substrate, including (but not limited to) ZONYL FSO-100 (E. I. du Pont de Nemours Company). Defoamers include long-chain ester- and silicone-type products, including (but not limited to) BETZ FOAMTROL 909. Paintability-enhancing agents include paintable silicones (Dow Corning) and organo-phosphate releases, such as ZELEC (DuPont Company). Leveling agents include high-boiling esters, ketones, hydrocarbons and silicone resins including (but not limited to) BYKETOL HS (BYK-Chemie). By way of example, representative resin compositions of the present invention are disclosed in Examples 1–4.

In a preferred embodiment, the resin composition comprises a water-dilutable (i. e., at least 1 part of water by weight per part of resin) phenolic-based resin containing 55%–65% non-volatile solids as measured by heating at 257° F. for 1.75 hours, having a viscosity of 200–1200 centipoise, having a weight-average molecular weight ($\overline{M}_w$) of 450 to 1300 daltons and having a hot plate cure time of 30 to 100 seconds at 300° F. More preferably, the water-dilutable phenolic-based resin contains 57%–63% non-volatile solids, has a weight-average molecular weight ($\overline{M}_w$) of 550 to 1200 daltons, and a hot plate cure time of 35 to 80 seconds at 300° F.

As noted above, the resin compositions of the present invention are either coated onto or impregnated into a fibrous substrate and then partially-cured to yield the resin-coated overlay. As used in this invention, the term "partially-cured" refers to "B-staged" curing of the resin-coated overlay as the term is used in this field. Fibrous substrates of the present invention generally fall within three basic categories: (1) cellulosic mat or sheets; (2) fibrous media with greater strength or other mechanical properties; and, (3) fibrous substrates which have already been treated with a resin, such as MDOs.

Fibrous substrates of the first category include (but are not limited to) cellulosic mats or sheets, such as bleached or unbleached Kraft paper (available from Westvaco, Union Camp Corporation, Mead Paper Company or Simpson Paper Company, as saturating-grade or converting natural or bleached Kraft). In the case of Kraft paper, the paper weight preferably ranges from about 25–180 lb. per ream and, more preferably, in the range of about 50–160 lb. per ream. Generally, lighter-weight paper (e.g., 50–100 lb. per ream) is used when the underlying solid substrate has a relatively-smooth surface. For example, hardwoods do not check much from wetting and drying stresses and generally are subject to fewer surface imperfections than, for example, softwoods. Thus, the use of solid substrates made from a softwoods generally require a heavier-weight paper (e.g., 130–160 lb. per ream) to more effectively resist the checking and surface imperfections associated with such solid substrates. Fibrous substrates of this category are suitable for producing MDOs and for impregnation with the resin compositions of the present invention.

Fibrous substrates of the second category include those which possess improved strength or other mechanical properties. Such fibrous substrates may include woven or air- or wet-laid glass, and synthetic organic fibers such as polyester, polyamide or carbon fiber, as well as mixtures of the same, including mixtures with bleached or unbleached cellulosic fibers. Suitable fibrous substrates of this category include DACRON polyester, nylon, and KEVLAR and NOMEX aramids (E. I. du Pont de Nemours Company). As with the first category of fibrous substrates, this second category of fibrous substrates are also suitable for producing MDOs and for impregnation with the resin compositions of the present invention.

Fibrous substrates of the third category include those in which the fibrous substrates have been previously-impregnated with some type of resin and cured to some extent. In a preferred embodiment, the fibrous substrate has been previously-treated with a thermosetting resin and substantially-cured to yield a thermoset fibrous substrate, for example, an MDO. Fibrous substrates which have been impregnated with a thermoset resin include (but are not limited to) the following commercially available products: Simpson Select MDO products 303-01, 323-01, and 343-01 containing 28%, 35% and 38% by weight resin, respectively (Simpson Timber Company); DYNOPREG MDO products (Dyno Overlays, Inc.), SWEDOTEC MDO products (Casco Nobel Industrial Products AB), and IMPREX MDO products (Laminating Papers, Ltd.). In a preferred embodiment, the thermoset fibrous substrate is C-staged MDO having a phenolic-based resin content ranging from 22%–45% by weight such as the Simpson Select MDO products 303-01, 323-01 and 343-01 (Simpson Timber Company).

Suitable MDOs of this invention can be produced by saturating a fibrous substrate with a saturating-grade resin, such as a saturating-grade phenolic resin sold by Georgia-Pacific Resins, Inc. or Borden Chemical. The saturated fibrous substrate is then substantially-cured using any one of several techniques, including passage through a standard circulating oven with a plurality of heating zones at a temperature in the range of about 250° F. to 450° F. When substantially-cured (C-staged), the thermoset fibrous substrate contains approximately 2% to 5% by weight of volatile materials mostly in the form of water vapor, and with less than about 1% by weight in the form of volatile phenolic-based components. In this context, the volatile materials percentage is determined by weighing the sample as produced, as well as weighing the sample after heating in a circulating oven at 320° F. to 340° F. for 5–10 minutes, where % volatiles={(starting wt.−dried wt.)/starting wt.}× 100.

As mentioned above, the resin compositions of the present invention may be either coated on or impregnated into the fibrous substrate. For coating purposes, the resin composition has a viscosity of less than 20,000 centipoise and, preferably, less than 5,000 centipoise. In contrast, when impregnating the fibrous substrate, the resin composition should have a viscosity of less than about 1,000 centipoise and, preferably, less than 500 centipoise. Acceptable resin composition viscosity may be determined by a standard bottle-saturation test in which the resin composition is placed in a 1 pint mason canning jar and a disk of the fibrous substrate is placed under the lid closure ring. The bottle is then inverted and the time for the resin composition to penetrate the disk is noted. Complete wetting of the disk in less than 15 seconds indicates acceptable impregnation behavior for the resin composition.

Coating of the fibrous substrate with the resin composition may be accomplished by any one of several suitable techniques, including (but not limited to) spraying, coating, painting or swabbing the resin composition onto the fibrous substrate.

Similarly, impregnation may be accomplished by any one of several suitable techniques, including (if necessary) diluting the resin composition to an acceptable viscosity by the addition of an appropriate solvent (such as alcohol or water), followed by passing the fibrous substrate through the solution for sufficient time such that the fibrous substrate is fully-impregnated (i.e., "wetted") with the resin composition. The wetted fibrous substrate may then be passed between two polished steel metering rolls with a controlled spacing to meter-off the excess resin composition and to aid in impregnation of the fibrous substrate. The concentration of the resin composition and metering roll spacing are adjusted such that the incorporation of resin non-volatiles into the fibrous substrate is in the range of 15%–65% by weight as measured after further drying as described above.

After the fibrous substrate is coated or impregnated with the resin composition, the resin-coating, on the surface of the fibrous substrate is partially-cured to yield the resin-coated overlay of this invention. Either the resin composition or the fibrous substrate, or both, may have thermosetting characteristics. For example, in one embodiment of this invention, the resin composition need not be thermosetting if the fibrous substrate is saturated with a thermosetting resin. In a preferred embodiment, the resin composition is coated onto an MDO, and partially-cured to produce the resin-coated overlay. Such resin-coated overlays of this invention have with properties which equal or surpass those of HDO/MDO or PSF/MDO combinations, and offer significant cost and handling advantages. Furthermore, by incorporation of various additives and/or release agents into the resin composition, the properties of the resin-coated overlay may be tailored to fulfill specific end-use requirements. In addition, properties can be achieved with the resin-coated overlays of this invention which would be costly, difficult or even impossible to achieve by using just a saturating resin. Rather, by employing the resin compositions of this invention, a wide variety of additives and/or agents can be used which are not acceptable for use in traditional saturating resins, thereby presenting opportunities for product improvement and tailoring for specific needs.

After coating or impregnating the fibrous substrate with the resin composition, the resin-coating on the surface of the fibrous substrate is partially-cured (B-staged) using any one of several suitable techniques, including (but not limited to) heating at a temperature ranging from 200° F. to 450° F. for a period of time ranging from 1 to 5 minutes, and preferably from 250° F. to 350° F. for 2.5–3 minutes. This partial-curing step enhances the flow characteristics of the resin composition on the surface of the fibrous substrate (as well as the optional adhesive layer discussed in greater detail below). As used herein, acceptable flow characteristics of the partially-cured resin coating is achieved when the partially-cured resin-coating contains from 2%–8% by weight volatile materials (as measured by the technique disclosed above), wherein 1% or more of the volatile materials are volatile resin components. Preferably, the volatile materials content of the partially-cured resin-coating ranges from 3%–6%, wherein 1%–3% of this amount are volatile resin components; and, more preferably, the volatile materials content of the partially-cured resin-coating is about 4%, wherein 1.5%–2.5% of this amount are volatile resin components.

Figure 2:
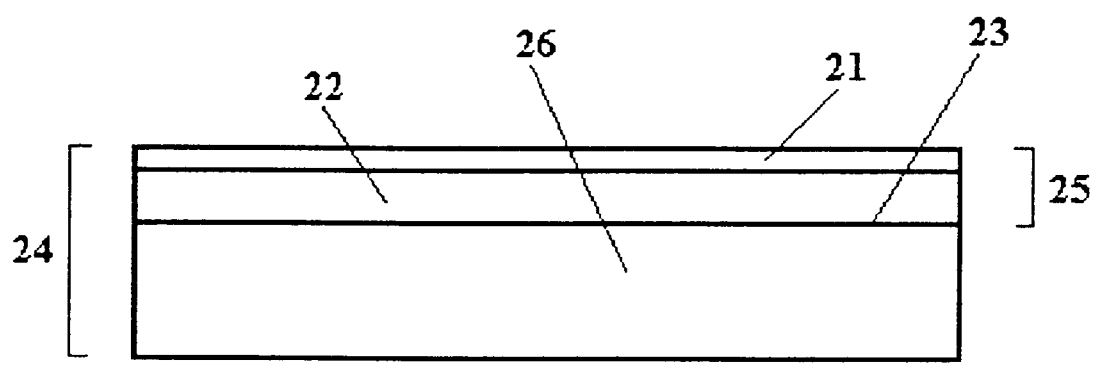
FIG. 2 illustrates a resin-coated overlaid solid substrate 24 of this invention, wherein resin-coated overlay 25 is adhered to solid substrate 26 along adhesion line 23, and wherein resin-coated overlay 25 comprises fibrous substrate 22 having a substantially-cured resin coating 21 thereon.
Figure 3:
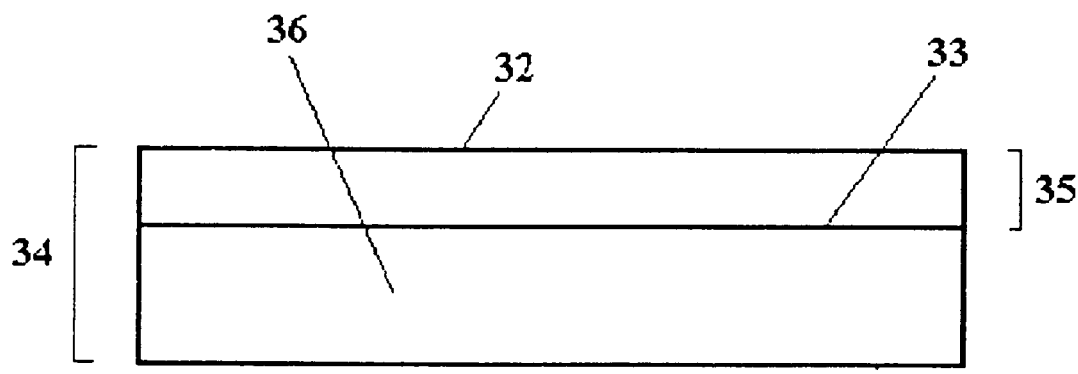
FIG. 3 illustrates an alternative resin-coated overlaid solid substrate 34 of this invention, wherein resin-coated overlay 35 is adhered to solid substrate 36 along adhesion line 33, and wherein resin-coated overlay 35 comprises a fibrous substrate impregnated with a resin and having a substantially-cured resin coating upon surface 32 thereof.

A representative resin-coated overlay of this invention is illustrated in FIG. 1. Specifically, resin-coated overlay 15 includes a partially-cured resin-coating 10 on a surface of fibrous substrate 12. As shown in FIG. 2, resin-coated overlay 25 is bonded to solid substrate 26 alone adhesion line 23 to yield resin-coated overlaid solid substrate 24. In an alterative embodiment, as illustrated in FIG. 3, resin-coated overlay 35 is bonded to solid substrate 36 along adhesion line 33 to yield resin-coated overlaid solid substrate 34. In this embodiment, resin-coated overlay 35 is an impregnated fibrous substrate having a substantially-cured resin coating 32 on the surface of resin-coated overlay 35.

One (or more) resin-coated overlay(s) of this invention may be bonded to a solid substrate using any one of several suitable techniques. In a preferred embodiment, the surface of the resin-coated overlay which is to be in contact with the solid substrate is coated with a suitable adhesive which will adhere the resin-coated overlay to the solid substrate. Suitable adhesives include (but are not limited to) CASCOPHEN, CASCOMEL, ASTROMEL and CASCO RESIN (Borden Chemical). Commercially-available thermoset fibrous substrates having an appropriate glue coat include (but are not limited to) Simpson Select MDO products 303, 323 and 343 (Simpson Timber Company).

The flow characteristics of the adhesive may be judged by hot-pressing a 6 inch by 6 inch area of the adhering surface against a pre-weighed piece of bleached cotton muslin sheeting at 250° F. and a pressure of 330 psi for 1.5 min. While the sample is still warm, the cloth is peeled from the adhering surface and reweighed. Under these test conditions, the transfer of 0.60–0.90 grams of glue coat solids to the cloth is judged to be acceptable to provide a good bond to the solid substrate. In this context, suitable adhesives also include thermoset and air-dry adhesives such as a phenolic, melamine, and urea, as well as polyvinyl acetate (PVA) emulsions.

Alternatively, the adhesive may be omitted from the fibrous substrate, provide that an adhesive is applied to the surface of the solid substrate that is to be bonded to the resin-coated overlay. Alternatively, a suitable paper-borne adhesive sheet may be employed, such as DYNOPREG PGL (Dyno Overlays, Inc.). Such an adhesive sheet may be inserted between the resin-coated overlay and the solid substrate prior to pressing.

In a preferred embodiment of the present invention, the solid substrate is wood-based and the resin-coated overlay is bonded to the wood-based solid substrate by the use of temperature and pressure as typically used in commercial plywood presses. Such pressing may be carried out by any one of several techniques, including either directly on heated press plattens or between aluminum or polished stainless steel plates, called carrier cauls, generally at temperatures of 275–300° F. and pressures of 200–250 psi for 5–10 minutes.

In a further aspect of this invention, surface-active chemicals or fillers such as TEFLON (duPont de Nemours Company), or micronized polypropylene or polyethylene, may be applied as a coating to the fibrous substrate by the above techniques, whereas such a coating would be difficult to achieve using just a saturating resin due to flotation problems associated with such chemicals or fillers.

In another aspect of the present invention, the ability of the resin-coated overlay to resist face-checking or splitting of the wood-based substrate in response to wetting and drying stresses during use may be significantly enhanced by cutting the resin-coated overlays into sheets, and orienting the sheets such that the strongest direction of the resin-coated overlay (as measured by tensile strength—that is, the machine direction during paper manufacture) runs perpendicular to the wood grain of the wood-based substrate (e.g., plywood face veneers).

In yet a further aspect of the present invention, the resin-coated overlaid solid substrate is used for the manufacture of concrete forms. Suitable release properties may be achieved without (or with very limited use of) field-applied form oils, thus reducing material and labor costs, as well as eliminating or reducing potential for environmental pollution. Moreover, additives can be incorporated in the resin-coated overlay which cannot generally be applied in the field because of solubility constraints. The hard surface of the resin-coated overlay provides added resistance to mechanical damage, such as vibrator "burns" during the placing of the wet concrete, and from general abuse during installation of the concrete forms. The working surface of the resin-coated overlay is also protected from chemical attack by alkaline entities in the concrete, both through the sealing action of the resin-coated surface and through penetration of mobile, waterproofing components into voids in the overlay structure during hot-pressing.

Alternatively, the resin-coated overlays of this invention may be used for the manufacture of paintable surfaces and/or tape-accepting surfaces on solid substrates. In this embodiment, the amount of wax in the resin composition is reduced or eliminated (i.e., 0–2% by weight), or replaced with paintable or tape-accepting agents. Pressing conditions for paintable and tape-accepting surfaces are the same as disclosed above. Such surfaces find application as substitutes for paint-grade or highway-sign grade HDO products or HDO/MDO combination products which require paintable surfaces, or surfaces to which reflective or other contact tapes will adhere.

The following examples are provided by way of illustration, not limitation.

EXAMPLES

Examples 1–4 illustrates the preparation of representative resin compositions (i.e., A through D) of this invention.

Example 1

| Resin Composition | Ingredients | Amount (parts by weight) |
|---|---|---|
| A | Phenolic Resin | 250 |
| | BETZ FOAMTROL 909 | 1.6 |
| | 5% (w/w) Ferric Chloride | 14.4 |
| | MICHEM 156 emulsion | 30.0 |
| | MICHEM 01250 emulsion | 15.0 |
| | CASCOREZ IB-515 emulsion | 13.6 |
| | ZONYL FSO-100 | 3.0 |

Resin composition A is a red-brown, milky syrup having a viscosity (at 74° F.) of 2,985 centipoise (Brookfield #2 spindle/6 rpm), and calculated non-volatiles of 54.2%.

Example 2

| Resin Composition | Ingredients | Amount (parts by weight) |
|---|---|---|
| B | Phenolic Resin | 250 |
| | BETZ FOAMTROL 909 | 1.8 |
| | 5% (w/w) Ferric Chloride | 14.4 |
| | MICHEM 156 emulsion | 60.0 |
| | MICHEM 01250 emulsion | 30.0 |
| | CASCOREZ IB-515 emulsion | 13.6 |
| | Water | 52 |

Resin composition B is a red-brown, milky syrup having a viscosity (at 74° F.) of 2,320 centipoise (Brookfield #2 spindle/12 rpm), and calculated non-volatiles of 45.0%.

Example 3

| Resin Composition | Ingredients | Amount (parts by weight) |
|---|---|---|
| C | Phenolic Resin | 250 |
| | 5% (w/w) Ferric Chloride | 14.4 |
| | MICHEM 156 emulsion | 60.0 |
| | MICHEM 01250 emulsion | 9.9 |
| | MICHEM 32535 emulsion | 28.7 |
| | CASCOREZ IB-515 emulsion | 13.6 |
| | Water | 46.1 |

Resin composition C is a red-brown, milky syrup having a viscosity (at 74° F.) of 9,600 centipoise (Brookfield #2 spindle/12 rpm), and calculated non-volatiles of 45.0%.

Example 4

| Resin Composition | Ingredients | Amount (parts by weight) |
|---|---|---|
| D | Phenolic Resin | 250 |
| | 5% (w/w) Ferric Chloride | 14.4 |
| | MICHEM 43040 emulsion | 56.2 |
| | MICHEM 156 emulsion | 60.0 |
| | MICHEM 01250 emulsion | 60.0 |
| | CASCOREZ IB-515 emulsion | 13.6 |

Resin composition D is a red-brown, milky syrup having a viscosity (at 74° F.) of 33,320 centipoise (Brookfield #3 spindle/3 rpm), and calculated non-volatiles of 49.5%.

Examples 5–8 illustrate the manufacture of representative resin-coated overlays of the present invention, and bonding the same to a 6×6×½-inch 5-ply Douglas fir plywood panel.

Example 5

A resin composition was prepared by first mixing a water-dilutable phenol resin with modifiers including a defoamer, a colorant and an auxiliary release agent (i.e., Resin Composition A of Example 1). To this composition was added 5% by weight of resin solids carnauba wax (MICHEM 156) and 5% by weight of resins solids of paraffin wax (MICHEM 01250), both supplied as emulsions in water (manufactured by Michelman, Inc.). Finally, a plasticizing polyester (CASCOREZ IB-515) was added in the amount of 5% by weight of resin solids.

The resin composition was then applied at the rate of 8–15 grams/ft$^2$ wet (5–9 grams/ft$^2$ coating solids) to one side of a previously phenolic-saturated and "C staged" Kraft paper MDO (Simpson Select 323 MDO). The glueline was already on the MDO, so only one side was coated by taping the sample with the gluecoat down on a horizontal, flat glass plate, applying the wet coating as a band at the upper end of the finished surface and drawing it over the face with a wire-wound Meyer rod. Samples were prepared using #54, #60, and #80 rods (roughly giving 0.005–0.008 inch, or 5–8 mil, wet coating). These samples were thermally-treated either horizontally or vertically in a circulating, forced-air oven at 250° F. for 1–5 minutes until the total sample volatile material (as measured after subsequent drying at 320° F. for 10 minutes) was about 4%. Gluecoat cloth flow was measured at 250° F., 330 psi for 1.5 minutes and found to be about 0.6 g/36 in$^2$ (6×6 inch area).

The partially-cured coated paper was then fused to a plywood test panel (i.e., Test Panel 1) in a laboratory plywood press at 285° F. at a pressure of 200 psi for 6.5 minutes using aluminum carrier caul plates. The samples were left open and cooled to room temperature over approximately 15 minutes after pressing. The finished surface was hard and moderately-glossy, and had a waxy feel after pressing. Visualization of surface porosity by rubbing with powdered material showed it to be very smooth and defect-free.

Example 6

In this example, the steps of Example 5 were repeated, except that the wax content of the resin composition was increased. Specifically, Resin Composition B of Example 2 was used, wherein the amounts of carnauba and paraffin waxes MICHEM 156 and MICHEM 01250, respectively, of the resin composition were each increased to 10% by weight. The resin composition and adhesive were then coated on opposite sides of the Kraft paper, partially-cured, and bonded to a plywood test panel (i.e., Test Panel 2) as described above in Example 5. The resulting surface was similar to that of Test Panel 1 of Example 5, but with a more waxy surface.

Example 7

In this example, the steps of Example 5 were again repeated, except that Resin Composition C of Example 3 was employed. Resin Composition C comprises a wax blend containing equal weights of polyethylene and paraffin waxes (MICHEM 32535 and MICHEM 01250, respectively) (3.3% by weight of each) substituted for the paraffin wax of Resin Composition B. The resulting plywood test panel was labeled Test Panel 3. The surface of Test Panel 3 was the similar to Test Panel 1 of Example 5.

Example 8

In this example, the steps of Example 5 were again repeated, except that Resin Composition D of Example 4 was employed. Resin Composition D contained a polypropylene wax (MICHEM 43040) in the amount of 15% by weight in place of the polyethylene wax of Resin Composition C, the amount of paraffin wax was increased to 20% by weight, and the amount of plasticizing polyester (CASCOREZ IB-515) was increased to 10% by weight of resin solids. The resulting plywood test panel was labeled Test Panel 4, the surface of which was again similar to Test Panel 1 of Example 5.

Example 9

In this experiment, the finished surfaces of Test Panels 1–4 from Examples 5–8, respectively, were evaluated for chemical resistance by exposure to a 5% sodium hydroxide solution. A 1.5-inch-wide-mouth jar containing approximately two ounces of 5% (w/w) sodium hydroxide was inverted on the each test panel surface. The vacuum in the bottle allowed the solution to remain in contact with the surface without drying out. The inverted bottle containing sodium hydroxide remained in place for 5 hours at 74° F. The laboratory test panels were all ½-inch 5-ply Douglas Fir plywood panels to which the coated overlays (Examples 5–8) were bonded. For comparison, the experiment was repeated using plywood panels overlaid with MDO (Simpson Select 323), HDO (Simpson Select 142) over MDO, and PSF (Simpson Select 191-07) over MDO. The results of this experiment are summarized in Table 1, and illustrate the improved chemical resistance of the resin-coated overlays of this invention toward alkaline conditions.

TABLE 1

| Chemical Resistance of Representative Resin-Coated Overlays | | |
|---|---|---|
| Resin-Coated Overlay | Effect Of 5% Sodium Hydroxide Solution | Color Of Sodium Hydroxide Solution |
| Test Panel 1 | Very slight roughening; slight softening | Colorless |
| Test Panel 2 | Very slight roughening; slight softening | Colorless |
| Test Panel 3 | Very slight roughening; slight softening | Colorless |
| Test Panel 4 | Very slight roughening; slight softening | Colorless |
| MDO | Severe swelling; very soft and degraded | Medium Yellow |
| HDO/MDO | Severe swelling; very soft and degraded | Medium Yellow |
| PSF/MDO | Swelled; slightly softed | Pale Magenta |

Example 10

In this example, Test Panels 1–4 from Examples 5–8, respectively, were evaluated as forming panels for white architectural concrete. This concrete comprised a standard mix of 3 parts Lonestar pea gravel, 2 parts sand (Unimin granusil™ silica), 1 part Riverside White Cement (all by volume) plus sufficient water to give a workable slurry. As with Example 9, the results were compared to those from overlaid panels with uncoated MDO and HDO/MDO. No form release oils were used in these tests. The concrete pour tests were carried out several different ways. For preliminary screening of finished surfaces, pours were made by filling Solo 9 oz. UltraClear™ drinking cups about one-half full with wet concrete mix and inverting them on the surface of 6×6×½-inch plywood test panels. Each panel was vibrated on an inverted orbital sander for 10 seconds to displace air at the concrete/panel interface. The poured samples were cured either at ambient temperature for 48 hours or, for accelerated testing, in an oven at 120° F. for 16 hours.

Ease-of-release was evaluated objectively by measuring shearing force required to slide the monolith from the panel surface using a Chatillon stress-strain scale or an Instron automated stress-strain testing instrument. In order to compare the data for Test Panels 1–4 with the control panels, a scale was established. In this context, "Very Easy" corresponds to a shearing force of 0–100 lb.; "Moderately Easy" corresponds to a shearing force of 100–200 lb.; "Moderate" corresponds to a shearing force of 200–300 lb.; "Moderately Hard" corresponds to a shearing force of 300–400 lb.; "Hard" corresponds to a shearing force of 400–500 lb.; and "Very Hard" corresponds to a shearing force in excess of 500 lb. Ease-of-wipe was judged subjectively by rubbing the finished surface in one-half of the poured area with a piece of burlap sacking and judging the amount of force required and the appearance of the surface after 8–10 rubs. The amount of hard flash under the edge of the forming cup and its ease of removal by scraping with a wood tongue depressor also was judged subjectively.

After concrete removal, the test panels were dried at 150° F. for two hours to simulate the hot exposure in horizontal concrete forming. The panels were cooled to ambient temperature, and the concrete pours were repeated, aligning the forming cap in the previously poured-against area. This cycle (i.e., pour-cure-release-heat) was repeated 10 times. The results of this experiment are presented in Table 2. As noted in Table 2 under the heading "Appearance of Concrete", the phenomenon of "pinking" is the result of the interaction of low molecular weight phenolics in the resin-coated overlay with alkaline components in the concrete which leaves an undesirable rose-to-magenta stain on the cured concrete surface.

TABLE 2

Use of Resin-Coated Overlays as Concrete Forms

| Overlay | Pour 1 | Pour 10 |
|---|---|---|
| Ease of Release | | |
| Test Panel 1 | Very Easy | Moderate |
| Test Panel 2 | Very Easy | Moderate |
| Test Panel 3 | Very Easy | Moderately Easy |
| Test Panel 4 | Very Easy | Moderately Easy |
| MDO | Moderately Easy | Very Hard |
| HDO/MDO | Moderately Easy | Hard |
| PSF/MDO | Very Easy | Hard |
| Appearance of Surface | | |
| Test Panel 1 | Smooth; Very easy to wipe | Smooth; Moderately easy to wipe |
| Test Panel 2 | Smooth; Very easy to wipe | Smooth; Moderately easy to wipe |

TABLE 2-continued

Use of Resin-Coated Overlays as Concrete Forms

| Overlay | Pour 1 | Pour 10 |
|---|---|---|
| Test Panel 3 | Smooth; Very easy to wipe | Smooth; Moderately easy to wipe |
| Test Panel 4 | Smooth; Very easy to wipe | Smooth; Moderately easy to wipe |
| MDO | Roughened; Hard to wipe | Very rough; Hard to wipe |
| HDO/MDO | Smooth; Moderately easy to wipe | Moderately rough; Moderately hard to wipe |
| PSF/MDO | Smooth; Easy to wipe | Moderately rough; Moderately hard to wipe |
| Appearance of Concrete | | |
| Test Panel 1 | No Discoloration | No Discoloration |
| Test Panel 2 | No Discoloration | No Discoloration |
| Test Panel 3 | No Discoloration | No Discoloration |
| Test Panel 4 | No Discoloration | No Discoloration |
| MDO | Pinked | Brown spots; Overlay failure |
| HDO/MDO | Pinked edge | No pink; Slightly rough surface |
| PSF/MDO | Slight pink cast | Light tan concrete; Overlay failure |

Example 11

In this example, manufacture of the Test Panels 1–3 was scaled-up from 6×6×½-inch plywood test panels to 12×12×½-inch plywood test panels. It should be understood that Test Panels 1–4 of Example 10 were selected from a total of about 80 test panels in which various wax emulsions were examined individually, or as binary or ternary blends, at both high and low addition levels. The effect of auxiliary release agents, defoamers and film formers were also explored in this series of experiments. On the basis of cup pours, ease of release, ease of wipe and concrete discoloration, the resin-coated overlays of Test Panels 1–3 were determined to be the best, and thus carried to the 12×12×½-inch plywood test pour stage.

In this experiment, Test Panels 1–3 were screened further as 12×12×½-inch plywood test panels by pouring 12×2×2.5 inch test blocks in a box form using the white concrete mix. Cure time was two days at ambient temperature. Data for Test Panels 1–3 are presented in Table 3. As a control, a PSF/MDO test panel (i.e., Simpson Select 191-07 over Simpson Select 323) was also utilized. Release was judged by measuring the force needed to peel (tip) the test panel from the block surface both with the Chatillon scale in the push mode and subjectively when the range of the scale (7 kilograms) was exceeded. In this context, "Very Easy" corresponds to release pressure of 0–1 kilograms; "Easy" corresponds to 1–2 kilograms; "Moderately Easy" corresponds to 2–5 kilograms; "Moderately Hard" corresponds to 5–7 kilograms and "Hard" and "Very Hard" correspond to release pressures of greater than 7 kilograms. Ease-of-wiping the panel surface and ease of flash cleaning were judged as in the cup pours. Panels were heated at 150° F. for two hours, and the pouring cycle was repeated. Again, 10 complete pour-cure-release-heat cycles were made on each test surface.

The results of the concrete pour tests are summarized in Table 3, and illustrate that the resin-coated overlays of this invention have improved chemical resistance and release characteristics compared to existing PSF/MDO products.

TABLE 3

Use of Resin-Coated Overlays as Concrete Forms

| Overlay | Pour 1 | Pour 10 |
|---|---|---|
| Ease of Release | | |
| Test Panel 1 | Very Easy | Moderately Easy |
| Test Panel 2 | Very Easy | Moderately Easy |
| Test Panel 3 | Very Easy | Moderately Easy |
| PSF/MDO Test Panel | Moderately Easy | Moderately Hard |
| Appearance of Surface | | |
| Test Panel 1 | Smooth; Very easy to wipe | Smooth; Moderately easy to wipe |
| Test Panel 2 | Smooth; Very easy to wipe | Smooth; Moderately easy to wipe |
| Test Panel 3 | Smooth; Very easy to wipe | Smooth; Moderately easy to wipe |
| PSF/MDO Test Panel | Smooth; Moderately easy to wipe | Moderately rough; Moderately hard to wipe (failure of overlay) |
| Appearance of Concrete | | |
| Test Panel 1 | No Discoloration | No Discoloration |
| Test Panel 2 | No Discoloration | No Discoloration |
| Test Panel 3 | No Discoloration | No Discoloration |
| PSF/MDO Test Panel | Slightly Pinked | Brown patches due to overlay peel (failure of overlay) |

Example 12

In this example, the steps of Example 5 were repeated for a production-scale test with 4'×8' panels with the following differences: the C-staged phenolic saturated paper (equivalent to Simpson Select 323-01 MDO) was wet-coated in sequence by rod coating to apply the resin composition and a thermoset glue coat, and both coats were simultaneously thermally B-staged in a multi-zone circulating air oven at 250–450° F. for 0.5–1 min. Degree-of-cure was judged by the procedures disclosed herein. The resin-coated overlays were then bonded to the test panels by the pressing conditions identified in Example 5, and the resulting resin-coated overlaid wood-based substrates were stacked hot as they came from the press and cooled slowly. The resin-coated surface was smooth, hard and slightly waxy, and showed very slight surface porosity.

Example 13

This example illustrates a representative resin composition for use in producing a resin-coated overlay, and corresponding resin-coated overlaid solid substrate, which has an overlaid surface suitable for painting.

| Resin Composition | Ingredients | Amount (parts by weight) |
|---|---|---|
| E | Phenolic Resin | 250 |
| | BETZ FOAMTROL 909 | 1.6 |
| | MICHEM 156 emulsion | 1.3 |
| | CASCOREZ IB-515 emulsion | 13.6 |
| | ZELEC-UN | 2.5 |

Resin composition E is a red-brown, hazy syrup having a viscosity (at 74° F.) of 2,465 centipoise (Brookfield #2 spindle/6 rpm), and calculated non-volatiles of 55.6%. This resin composition may be used to manufacture resin-coated overlays, as well as resin-coated overlaid solid substrates suitable for painting, by the procedures disclosed here.

From the foregoing, it will be appreciated that, although specific embodiments of the invention have been described herein for purposes of illustration, various modifications may be made without deviating from the spirit and scope of the invention. Accordingly, the invention is not to be limited except as by the appended claims.

The invention claimed is:

1. A resin-coated overlay comprising a medium density overlay having a partially-cured resin-coating on at least a portion of a surface of the medium density overlay, wherein the partially-cured resin coating comprises a wax in an amount ranging from about 0.5% to 45% by weight and a phenolic thermosetting resin, and wherein the medium density overlay comprises an unbleached kraft paper.

2. The resin-coated overlay of claim 1 wherein the partially-cured resin-coating is cured to a volatile materials content of 2% to 8% by weight, wherein greater than 1% by weight of the volatile materials are volatile resin components.

3. The resin-coated overlay of claim 1 wherein the partially-cured resin-coating is cured to a volatile materials content of 3% to 6% by weight, wherein 1% to 3% by weight of the volatile materials are volatile resin components.

4. The resin-coated overlay of claim 1 wherein the partially-cured resin-coating contains a wax in an amount ranging from 2%–45% by weight.

5. The resin-coated overlay of claim 1 wherein the partially-cure resin-coating contains at least one agent selected from the group consisting of film forming agents, colorants, auxiliary release agents, defoamers, paintability-enhancing agents and leveling agents, and wherein each of such agents are present in an amount ranging from 0.1% to 10% by weight.

6. A resin-coated overlaid solid substrate comprising a resin-coated overlay of any one of claims 5 bonded to a solid substrate.

7. The resin-coated overlaid solid substrate of claim 6 wherein the solid substrate is a metal solid substrate.

8. The resin-coated overlaid solid substrate of claim 6 wherein the solid substrate is a wood solid substrate.

9. The resin-coated overlaid solid substrate of claim 8 wherein the wood solid substrate is selected from the group consisting of plywood, oriented strandboard, waferboard, particleboard and laminated veneer lumber.

10. The resin-coated overlaid solid substrate of claim 9 wherein the wood solid substrate is plywood.

11. The resin-coated overlaid solid substrate of claim 6 wherein the resin-coated overlay is bonded to the solid substrate with an adhesive.

* * * * *